US010661675B2

(12) United States Patent
Yu et al.

(10) Patent No.: US 10,661,675 B2
(45) Date of Patent: *May 26, 2020

(54) INTERNET-BASED INTELLIGENT MOBILE CHARGING SYSTEM AND METHOD

(71) Applicant: HUNAN SCIENTOP AUTOMATIC EQUIPMENT SHARES CO., LTD, Changsha (CN)

(72) Inventors: Xuekun Yu, Changsha (CN); Deng Hu, Changsha (CN); Xianwen Li, Changsha (CN); Shen Wang, Changsha (CN)

( * ) Notice: Subject to any disclaimer, the term of this patent is extended or adjusted under 35 U.S.C. 154(b) by 55 days.

This patent is subject to a terminal disclaimer.

(21) Appl. No.: 16/000,896

(22) Filed: Jun. 6, 2018

(65) Prior Publication Data

US 2018/0281613 A1    Oct. 4, 2018

Related U.S. Application Data

(63) Continuation of application No. PCT/CN2015/099134, filed on Dec. 28, 2015.

(30) Foreign Application Priority Data

Dec. 7, 2015 (CN) .......................... 2015 1 0886643

(51) Int. Cl.
*B60L 53/30* (2019.01)
*B60L 53/68* (2019.01)
(Continued)

(52) U.S. Cl.
CPC ............. *B60L 53/68* (2019.02); *B60L 3/0023* (2013.01); *B60L 53/305* (2019.02); *B60L 53/32* (2019.02);
(Continued)

(58) Field of Classification Search
CPC .......... B60L 53/68; B60L 53/57; B60L 53/32; B60L 53/305; B60L 53/665; B60L 53/65;
(Continued)

(56) References Cited

U.S. PATENT DOCUMENTS

2014/0266047 A1    9/2014   Robers et al.
2018/0281614 A1*  10/2018   Hu ...................... G06Q 30/0601

FOREIGN PATENT DOCUMENTS

CN         102982407 A        3/2013
CN         103439931 A       12/2013
(Continued)

OTHER PUBLICATIONS

International Search Report of PCT/CN2015/099134 dated Aug. 26, 2016.

*Primary Examiner* — Gertrude Arthur Jeanglaude
(74) *Attorney, Agent, or Firm* — Erson IP (Nelson IP)

(57) ABSTRACT

The disclosure provides an Internet-based intelligent mobile charging system and method. The system includes a rescue vehicle APP, a charging rescue vehicle, a rescued vehicle APP and a rescue platform. The rescue vehicle APP includes a first user module, a first order module, a monitoring module and a first communication module; the charging rescue vehicle includes a controller, a global position system (GPS) device, a direct-current charger, an alternative-current charger and a metering module; the rescued vehicle APP includes a second user module, a second order module, a payment module and a second communication module; the rescue platform includes an access module, an order execution module, a vehicle screening module, a rescue vehicle monitoring module, a bill management module and a user certification module.

6 Claims, 3 Drawing Sheets

(51) Int. Cl.
    *B60L 53/65*           (2019.01)
    *B60L 53/57*           (2019.01)
    *B60L 3/00*            (2019.01)
    *B60L 53/66*           (2019.01)

(52) U.S. Cl.
    CPC ............... *B60L 53/57* (2019.02); *B60L 53/65* (2019.02); *B60L 53/665* (2019.02); *B60L 2240/62* (2013.01); *B60L 2240/622* (2013.01); *B60L 2240/80* (2013.01); *B60L 2250/16* (2013.01); *Y02T 10/7005* (2013.01); *Y02T 90/16* (2013.01); *Y02T 90/163* (2013.01)

(58) Field of Classification Search
    CPC ............... B60L 3/0023; B60L 2240/62; B60L 2240/622; B60L 2240/80; B60L 2250/16; Y02T 10/7005; Y02T 90/16; Y02T 90/163
    USPC ......................................................... 701/22
    See application file for complete search history.

(56) References Cited

FOREIGN PATENT DOCUMENTS

| | | | |
|---|---|---|---|
| CN | 204190405 U | 3/2015 |
| CN | 104574676 A | 4/2015 |
| CN | 104659889 A | 5/2015 |
| CN | 105398348 A | 3/2016 |
| CN | 205256036 U | 5/2016 |
| CN | 205265276 U | 5/2016 |

* cited by examiner

US 10,661,675 B2

INTERNET-BASED INTELLIGENT MOBILE CHARGING SYSTEM AND METHOD

CROSS-REFERENCE TO RELATED APPLICATIONS

This application is a continuation of International Patent Application No. PCT/CN2015/099134 with a filing date of Dec. 28, 2015, designating the United States, now pending, and further claims priority to Chinese Patent Application No. 201510886643.5 with a filing date of Dec. 7, 2015. The content of the aforementioned applications, including any intervening amendments thereto, are incorporated herein by reference.

TECHNICAL FIELD

The disclosure relates to a mobile power supply, and particularly relates to an Internet-based intelligent mobile charging system and method.

BACKGROUND OF THE PRESENT INVENTION

With continuous popularization of a new energy fully electric vehicle, increasing fully electric vehicles will operate on the road. However, long charging time and short endurance mileage are inevitable defects of the fully electric vehicle. A fact that when the fully electric vehicle travels on the half way, electric quantity runs out and a charging pile cannot be found will be the most awkward situation faced by the fully electric vehicle.

Thus, a plurality of mobile charging vehicles for rescue occur on the market, but, when a driver of a rescued vehicle makes rescue application through a telephone or in a network manner, it is difficult for the rescue vehicle to rapidly find the rescued vehicle since a user cannot clearly describe the current geographic position or road.

Moreover, after applying rescue, the rescued vehicle can often just passively wait for the rescue vehicle, so the user experiment is extremely poor. And because of half-compulsory service of rescue, disadvantages such as long service process, poor service attitude and opaque service fee are caused. Sometime, on the contrary, rescue becomes imparity service, and the user becomes a victim.

SUMMARY OF PRESENT INVENTION

The technical problem to be solved by the disclosure is to provide an

Internet-based intelligent mobile charging system and method in order to solve the above problems existing in the prior art, thereby completing a one-key rescue function, quickening a rescue speed, increasing accuracy and efficiency of vehicle dispatching, completely eradicating mandatory consumption and imparity service, promoting transparency and timeliness of rescue service and improving service experience and service quality.

The technical solution adopted by the disclosure is as follows:

A internet-based intelligent mobile charging system, comprising: a rescue vehicle APP, a charging rescue vehicle, a rescued vehicle APP and a rescue platform, wherein the rescue vehicle APP includes a first user module, a first order module, a monitoring module and a first communication module; the charging rescue vehicle includes a controller, a global position system (GPS) device, a direct-current charger, an alternative-current charger and a metering module; the rescued vehicle APP includes a second user module, a second order module, a payment module and a second communication module; the rescue platform includes an access module, an order execution module, a vehicle screening module, a rescue vehicle monitoring module, a bill management module and a user certification module; a first serial port of the controller in the charging rescue vehicle is simultaneously connected with the direct-current charger, the alternative-current charger and the metering module, a second serial port of the controller is connected with the GPS device, and a third serial port of the controller is connected with the monitoring module of the rescue vehicle APP; the first user module, the first order module and the monitoring module of the rescue vehicle APP are simultaneously connected to the first communication module; the second user module, the second order module and the payment module of the rescued vehicle APP are simultaneously connected to the second communication module; the first and second communication modules are both connected with the access module of the rescue platform through Internet, the access module of the rescue platform is connected with the order execution module, the vehicle screening module, the bill management module, the rescue vehicle monitoring module and the user certification module; the charging rescue vehicle further includes a vehicle-mounted motor, a power takeoff, a chassis drive system, a generator, a cab operation panel, a charger operation panel, and a third communication module; an output shaft of the vehicle-mounted motor selects to be connected with an input shaft of the generator or the chassis drive system through the power takeoff, a power supply output of the generator is connected with an input interface of the metering device, an output interface of the metering device is connected with an alternative-current power supply input interface of the direct-current charger and a power supply input interface of the alternative-current charger, and output charging interfaces of the direct-current charger and the alternative-current charger are connected with a charging input interface of a fully electric vehicle; an analog output interface of the controller is connected with a throttle control line of the vehicle-mounted motor, a pulse input interface of the controller is connected with a rotary speed sensor of the generator, a first serial port of the controller is simultaneously connected with the metering device, the direct-current charger and the alternative-current charger, a CAN bus interface of the controller is connected with the cab operation panel and the charger operation panel, and a fourth serial port of the controller is connected with the third communication module; the third communication module is connected with the rescue platform through GPRS, and the rescue vehicle APP is connected with the rescue platform through Internet.

In the above technical solution, the GPRS includes but is not limited to WIFI, 3G and 4G.

A smart mobile charging method using Internet, comprising:

1) selecting a one-key rescue function on a rescued vehicle APP by a driver of an electric vehicle;

2) by the rescued vehicle APP, packaging user information and GPS information and sending a rescue application;

3) by the rescue platform, acquiring the rescue application and analyzing the user information and the GPS information to generate an order form;

4) calculating priority based on a preferred algorithm according to the GPS information of the current charging rescue vehicle by a vehicle screening module of a rescue platform;

5) pushing a charging rescue vehicle list to an operator according to a priority descending order by the rescue platform;

6) selecting a charging rescue vehicle having the highest priority to allocate the rescue order by the operator;

7) estimating rescue cost and time according to the GPS information of the charging rescue vehicle accepting the order by the rescue platform;

8) acquiring the order and accepting the order by the charging rescue vehicle;

9) pushing the estimated cost and time and a state of the charging rescue vehicle to the rescued vehicle APP by the rescue platform;

10) selecting whether the rescue order is accepted or not by the driver of the electric vehicle;

11) informing the rescue vehicle APP that execution of a rescue action is started by the order executing module of the rescue platform if the acceptance of rescue is selected;

12) in the process of rescue, by the rescue vehicle monitoring module of the rescue platform, acquiring GPS information of the charging rescue vehicle in real time and pushing the GPS information to the rescued vehicle APP, and knowing a position, a speed and expected arrival time of the charging rescue vehicle by the driver of the electric vehicle;

13) selecting a charging mode by the driver of the electric vehicle to charge the electric vehicle when the charging rescue vehicle arrives;

14) in the process of charging, sending data of the charger and the metering module to the rescue platform in real time by the charging rescue vehicle;

15) pushing real-time charging data of the charging rescue vehicle to the rescued vehicle APP by the rescue platform through the order execution module;

16) seeing the charging process on the rescued vehicle APP by a user;

17) after charging is completed, by the rescue vehicle APP, pushing the order information to be sent to the rescued vehicle APP via the rescue platform;

18) informing the user of payment by the rescued vehicle APP, and evaluating;

19) sending payment and evaluation information to the rescue platform by the rescued vehicle APP; and 20) by the rescue platform, ending this rescue and pressing the rescue order into the bill management module.

The above smart mobile charging method using Internet specifically comprises the following steps:

1) first, installing a rescued vehicle APP on a mobile phone of a driver of an electric vehicle, connecting a user module in the rescued APP to an access module of a rescue platform through a communication module and Internet, registering user information in a user certification module of the rescue platform, and binding a vehicle-relevant information of a fully electric vehicle;

2) operating the rescued vehicle APP on the mobile phone by the driver when the fully electric vehicle is broken down due to power shortage, at this moment, automatically initiating the user module by the rescued vehicle APP to be connected to the access module of the rescue platform by virtue of 3G and 4G networks through the communication module and Internet, entering a home page of the rescued vehicle APP through the rescue platform and after being certified by the user certification module, at this moment, allowing the driver to use a one-key rescue function so that the order module immediately initiates to send rescue application information, user data and current user GPS position data to the rescue platform through the communication module and Internet, and acquiring this data to be immediately pushed to the order execution module by the access module of the rescue platform;

3) generating a complete order form in the order execution module, and simultaneously allowing the acquired user information to be matched with vehicle data in database by the order form, and packaging the vehicle data and the GPS data to be pushed to a vehicle screening module;

4) after acquiring vehicle preferred application in the order execution module by the vehicle screening module, acquiring relevant GPS data, idle state data and vehicle model matching data from the monitoring module of the rescue vehicle APP according to the GPS information and the vehicle data of the rescued vehicle, then synthesizing data, performing priority scoring on each rescue vehicle according to a priority strategy algorithm, and pushing the data to the order execution module in a descending order according to scores;

5) by the operator of the rescue platform, selecting the most appropriate vehicle according to priority scores and allocating the order to this rescue vehicle;

6) installing the rescue vehicle APP on a display terminal of the rescue vehicle, when the rescue vehicle works, initiating the display terminal, connecting the rescue vehicle APP to the rescue platform through the communication module and Internet, and certifying by the user certification module on the rescue platform; due to a monitoring module existing in the rescue vehicle APP, communicating this monitoring module with the controller of the charging rescue vehicle through Bluetooth, a serial port, WIFI or Ethernet, and connecting the controller of the charging rescue vehicle with the direct-current charger, the alternative-current charger, the metering module and the GPS device through serial ports; acquiring relevant current, voltage and temperature data of the direct-current charger and the alternative-current charger from the controller of the charging rescue vehicle by the monitoring module of the rescue vehicle APP; packaging all the data such as electric quantity and charging duration relevant data of the metering module and GPS position data of the charging rescue vehicle to be sent to the access module of the rescue platform through the communication module and Internet, and then sending the data to the monitoring module of the rescue vehicle APP by the access module; and monitoring the position of each rescue vehicle, states of the alternative-current and direct-current chargers and data of the metering module by the monitoring module of the rescue vehicle APP;

7) when the order data is sent to the rescue vehicle APP by the order execution module of the rescue platform through the communication module and Internet, by an order module in the rescue vehicle APP, acquiring order information and showing the order information to the driver of the rescue vehicle, selecting acceptance or refusal by a worker of the rescue vehicle according to own conditions, reselecting the rescue vehicle by the rescue platform if refusal is selected, and calculating a distance and expected rescue cost by the rescue platform according to GPS information of the rescue vehicle and GPS information of the rescued vehicle if acceptance is selected; sending the expected cost and expected arrival time as well as relevant information of the charging rescue vehicle to the rescued vehicle APP by the rescue platform, receiving information by the rescued vehicle APP, auditing whether the order content is accepted by the driver of the fully electric vehicle, if the driver of the fully electric vehicle selects to accept the order, allowing the order to take effect, tracking an order execution process by the order execution module of the rescue platform, acquiring rescue vehicle data in the monitoring module of the rescue vehicle APP by the order execution module and sharing the rescue vehicle data to the order module of the rescued vehicle APP through the communication module and Internet; and inquiring the position, speed and expected arrival time state of the rescued vehicle in real time in the order module by the driver of the fully electric vehicle;

8) arriving at the position of the rescued vehicle by the charging rescue vehicle, selecting the charging mode by a user and charging the rescued vehicle, acquiring data of the metering module, the alternative-current charger and the direct-current charger of the rescue vehicle in real time by the monitoring module in the rescue vehicle APP, packaging, sending to the rescue vehicle monitoring module of the rescue platform through the communication module and Internet, sharing the data through the order execution module and the order module of the rescued vehicle APP, and seeing real-time situation of the charging rescue vehicle from the order module by the driver of the fully electric vehicle; and 9) after charging is completed, by the rescued vehicle APP, packaging relevant data of this charging and sending the data to the rescue vehicle monitoring module of the rescue platform through the communication module and Internet, transmitting the data to the order execution module by the rescue vehicle monitoring module, generating a bill by the order execution module, pushing the bill to the rescued vehicle APP through the access module, invoking a payment module by the rescued vehicle APP and paying by the user, evaluating this service after payment is completed, sending a payment state and evaluation information to the order execution module of the rescue platform through the communication module and Internet by the rescued vehicle APP after payment and evaluation are completed, ending this order by the order execution module, and then pressing the order record into the bill management module for storage so as to conveniently inquire by the user.

In the above technical solution, the charging method of the charging rescue vehicle comprises:

1) parking a mobile charging vehicle for rescue in front of a rescued fully electric vehicle;

2) switching a power takeoff to a power taking gear;

3) driving a generator to rotate by the motor;

4) detecting a rotary speed of the generator by the controller;

5) stepping on a throttle by the controller if the rotary speed of the generator does not reach a rated rotary speed, and reducing the throttle by the controller if the rotary speed of the generator exceeds the rated rotary speed;

6) measuring an output voltage of the generator by an automatic voltage regulator (AVR) when the rotary speed of the generator reaches the rated rotary speed;

7) increasing excitation by AVR if the output voltage of the generator is lower than a rated voltage, and reducing excitation by AVR if the output voltage of the generator is higher than the rated voltage;

8) allowing the output voltage of the generator to reach a rated value and to be stabilized;

9) outputting a charging-allowable signal;

10) selecting the direct-current charger by the user for rapid charging, and closing a contactor of a direct-current rapid charger by the controller; and 11) selecting the alternative-current charger by the user for slow charging, and closing a contactor of an alternative-current slow charger by the controller.

In the above technical solution, the charging method of the charging rescue vehicle specifically comprises the following steps:

1) cutting down an output main drive shaft of the vehicle-mounted motor, installing the power takeoff on the main drive shaft, wherein the power takeoff has two gears respectively including a power taking gear and a walking gear; when a handle is switched into the walking gear, outputting the rotary speed of the vehicle-mounted motor to rear axle tire, and the vehicle normally walking; when the handle is switched into the power takeoff gear, outputting the rotary speed of the vehicle-mounted motor to an input shaft of the generator coaxially connected with the power takeoff by the power takeoff, and allowing the vehicle to enter a generation working state;

2) by the vehicle-mounted motor, driving the input shaft of the generator to rotate through the power takeoff, installing a speed-measuring code wheel on the input shaft of the generator, and installing a speed-measuring sensor to detect the rotary speed of the generator, allowing the signal of the speed-measuring sensor to access to a pulse input interface of the controller, detecting whether the rotary speed of the generator reaches the rated rotary speed by the controller, such as 1500 rpm, if the rated rotary speed is not reached, increasing analog quantity output by the controller through a proportion-integral-differentiation (PID) algorithm, and enlarging the throttle; whereas, if the controller detects that the rotary speed of the generator exceeds the rated rotary speed, reducing the analog quantity output by the controller through the PID algorithm, and reducing the throttle, thereby allowing the rotary speed of the generator to be constant;

3) after the rotary speed of the generator is stabilized, namely 1500 rpm±4%, detecting the output voltage by an AVR module inside the generator, increasing excitation when the output voltage does not reach the rated value, whereas, reducing excitation when the output voltage is over high, thereby achieving the purpose of stabilizing an output power source of the generator;

4) allowing three-phase alternative-current 380 V power supply emitted by the generator to access to the metering device, measuring voltage, current, frequency and other relevant state data of the input power supply and metering electricity consumption by the metering device; and by the controller, acquiring power supply state parameters and metering electrical degree data through the serial ports;

5) when the controller detects that the state of the power source is stabilized, such as 380 V±5%, outputting a charging-allowable signal by the controller; if the user selects direct-current rapid charging, outputting a control signal by the controller to control the closing of the contactor, and providing a power supply at an output end of the metering device to the direct-current charger; by a rectifier module in the direct-current charger, first, changing an input alternative-current power supply into direct current electricity through rectification, and meanwhile, acquiring battery and relevant data of the charged vehicle through a CAN bus by a CPU in the direct-current charger, and then regulating to a proper voltage and current via a secondary voltage-regulating module according to vehicle model and battery information to charge the electric vehicle; meanwhile, by the controller, acquiring operation data, including charging current, charging voltage, cell temperature and other crucial data for consideration, of the direct-current charger through serial communication;

6) if the user selects the alternative-current charger, by the controller, outputting a control signal, closing the contactor, connecting the power supply at the output end of the metering device to the power supply input interface of the alternative-current charger to charge the electric vehicle by the alternative-current charger; and similarly, by the controller, acquiring current, voltage and other data for consideration through serial communication;

7) setting a plurality of operation panels to be respectively placed beside a cab and chargers, displaying working parameters of various modules of a system on the operation panels, and setting buttons to control operation of each module of the system, in such a way, simultaneously seeing the working state of the system and instructing to the system by the driver and the user so as to achieve two-place operation and multi-place operation;

8) configuring the GPS device, by the GPS device, acquiring a satellite's signal to be converted into latitude and longitude information, and transmitting latitude and longitude data to the controller through serial communication; also configuring a wireless communication module, connecting the controller with the wireless communication module through a serial port to send the above vehicle state, GPS position information, charging current, voltage, electric quantity and vehicle information to the rescue platform, and learning the rescue process through the rescue vehicle APP; and 9) by the driver of the fully electric vehicle, installing the rescued vehicle APP and using one-key rescue function of the rescued vehicle APP, at this moment, sending rescue information and position information to the rescue platform by the rescued vehicle APP through GPRS, the GPRS including but not limited to 3G, 4G and WIFI, and after the rescue platform receives the rescue information, sending the rescue information to the controller through GPRS to guide the rescue vehicle to perform timely rescue, the GPRS including but not limited to 3G, 4G and WIFI.

Substantive features and significant effects are as follows:

In the Internet-based intelligent mobile charging system and method used by the disclosure, the rescued vehicle APP may be installed on a mobile phone of a user, and a driver of each fully electric vehicle installs the rescued vehicle APP under the condition that any cost is not increased and completes a one-key rescue function. The rescued vehicle APP may acquire GPS of the mobile phone and send it to a rescue vehicle through a rescue platform, and the rescue vehicle rapidly finds the rescued vehicle through a navigator, thereby completely eradicating situations that an address is unclearly described so as to cause the rescue vehicle to difficultly find the rescued vehicle when applying rescue through a telephone or Internet, thereby quickening the rescue speed.

According to the state of the rescue vehicle, positions of the rescue vehicle and the rescued vehicle and the model of the rescued vehicle, the vehicle screening module of the rescue vehicle involved in the rescue system and method of the disclosure may calculate priority for each useful rescue vehicle and instructs on-duty operators of the platform to dispatch vehicles, thereby greatly simplifying a vehicle dispatching flow procedure and increasing the accuracy and efficiency of vehicle dispatching.

In the rescue system and method of the disclosure, once the vehicle is successfully dispatched, the rescue platform may automatically estimate rescue distance, rescue time and rescue cost and the user confirms them, and the user may select acceptance of rescue or refusal of rescue according to actual situations to allow the user to clearly consume, thereby completely eradicating generation of overbidding utilizing specificity of the rescue and imparity service.

In the rescue system and method of the disclosure, during the rescue process and the charging process, the rescue vehicle may send GPS position information and charging metering state information to the rescue platform to be shared by the rescue platform and the user, and the rescue service process is evaluated after the rescue is completed, in such a way, the whole rescue process is transparentized, the user may supervise and grasp the rescue process all the time so as to promote the transparency of the rescue and improve the timeliness of the rescue service, and scores the rescue service, thereby continuously improving the service experience.

In the rescue system and method of the disclosure, the order is managed by a specific bill management module after being completed, and the user may inquire the service process and the service bill in real time.

According to the disclosure, an energy storage battery is abandoned, electricity generation is directly performed by the generator, and a new energy vehicle is charged by the direct-current or alternative-current charger, and thus the weight of the whole vehicle is lowered, energy loss is reduced, system cost is reduced and economy is ensured, and meanwhile double energies diesel and natural gas may be adopted so the environment is also guaranteed. Moreover, because the energy storage battery is abandoned, no difficult recovery exists, and secondary pollution is not caused. Also, parts are not frequently changed due to the service life of the battery.

The disclosure adopts a parking power takeoff to take power from a chassis motor, and thus electricity generation and travel share the power source, so as to omit a motor of a diesel generating set, reducing the total mass of the system, reducing the system cost while reducing energy consumption, and guaranteeing economy.

Because parts of new energy vehicles only have alternative-current charging interfaces, and direct-current charging interfaces of parts of new energy vehicles are not unified with the protocol. Thus, in order to ensure the efficiency and universality of this mobile charging vehicle, the system is simultaneously equipped with a direct-current rapid charger and an alternative-current slow charger so that efficiency and universality are unified.

In the disclosure, a generator power supply is adopted to be connected to the alternative-current charger, so efficiency is extremely high, and energy consumption is greatly reduced.

In the disclosure, a GPS positioning system is equipped, and thus the current position of the charging vehicle may be known in real time, and an accident vehicle may be found conveniently through the navigator so as to shorten rescue time.

In the disclosure, a wireless data transmission system is equipped to send a vehicle state, a vehicle position, a vehicle track and relevant data such as voltage, current and electric quantity of charging to the charging platform. Moreover, inquiry and exhibition are performed through the rescue APP. Therefore, both of the driver of the accident vehicle and a charging vehicle management platform extremely definitely monitor and inspect overall processes of charging and rescue, so that the rescue process comes out into the open and becomes transparent, and the user may clearly make consumption and also may extremely conveniently track the rescue process.

DETAILED DESCRIPTION OF PREFERRED EMBODIMENTS

Figure 1:
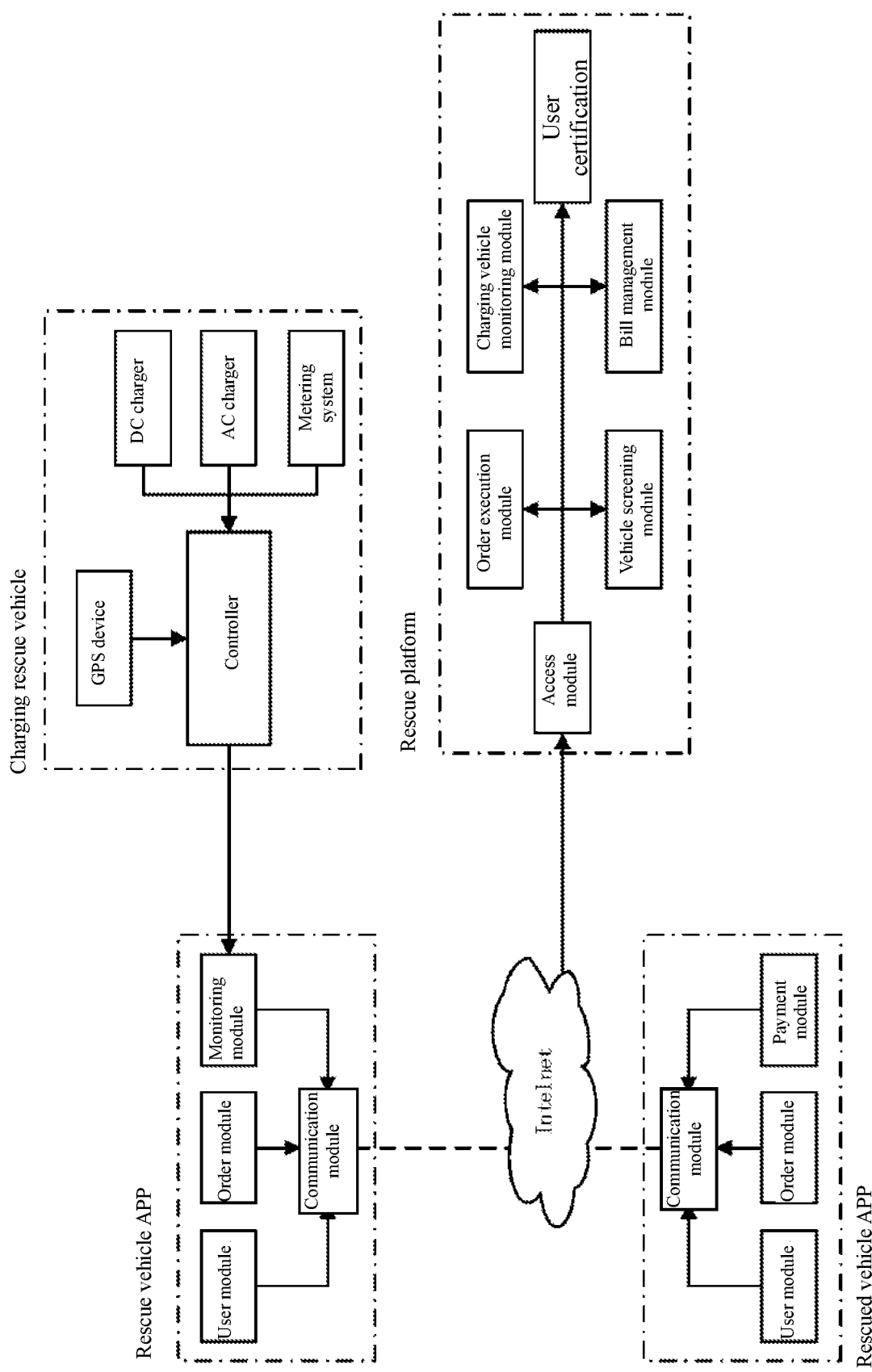
FIG. 1 is a principle diagram of a system according to the disclosure.
Figure 2:
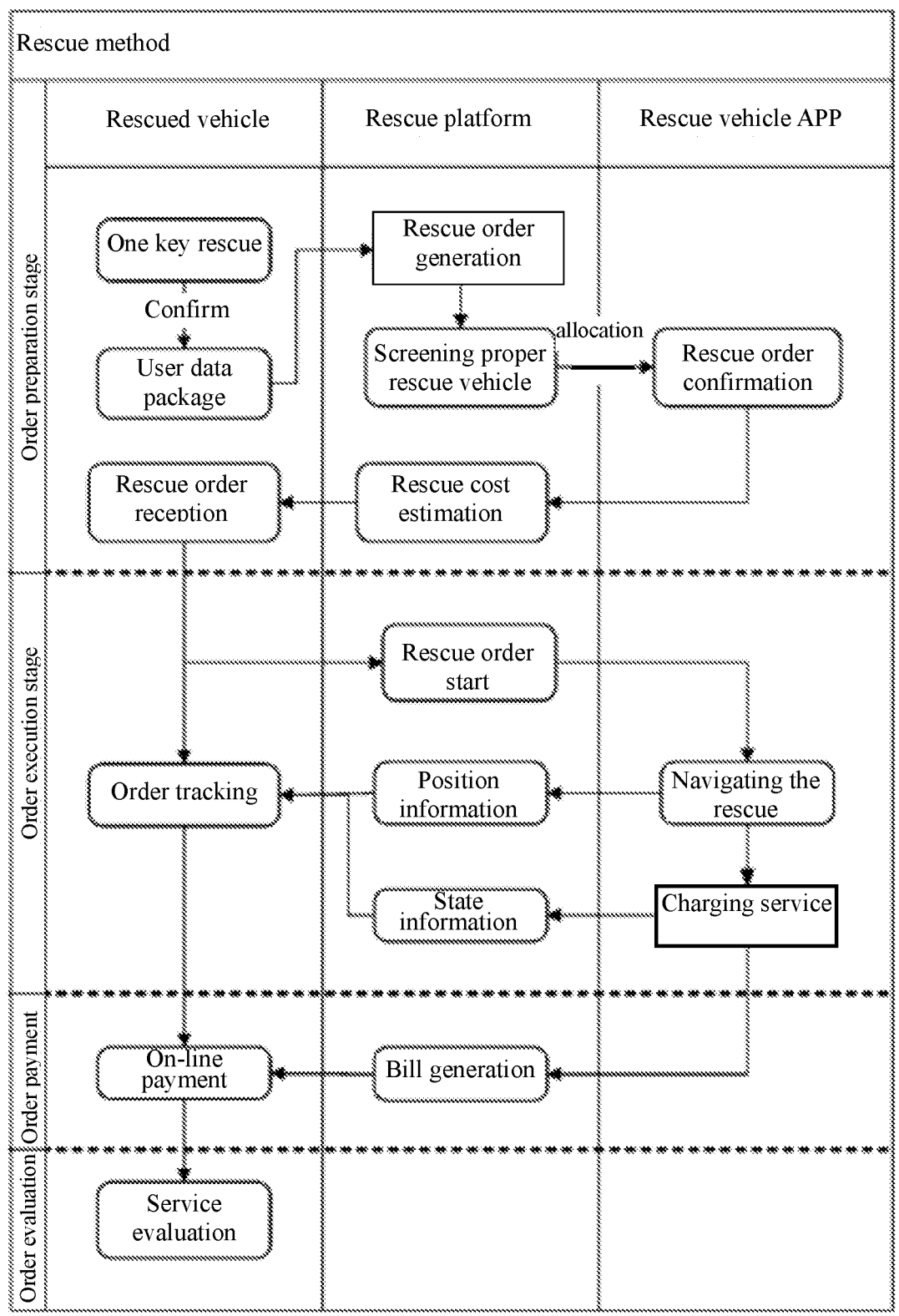
FIG. 2 is a flow chart of a method according to the disclosure.
Figure 3:
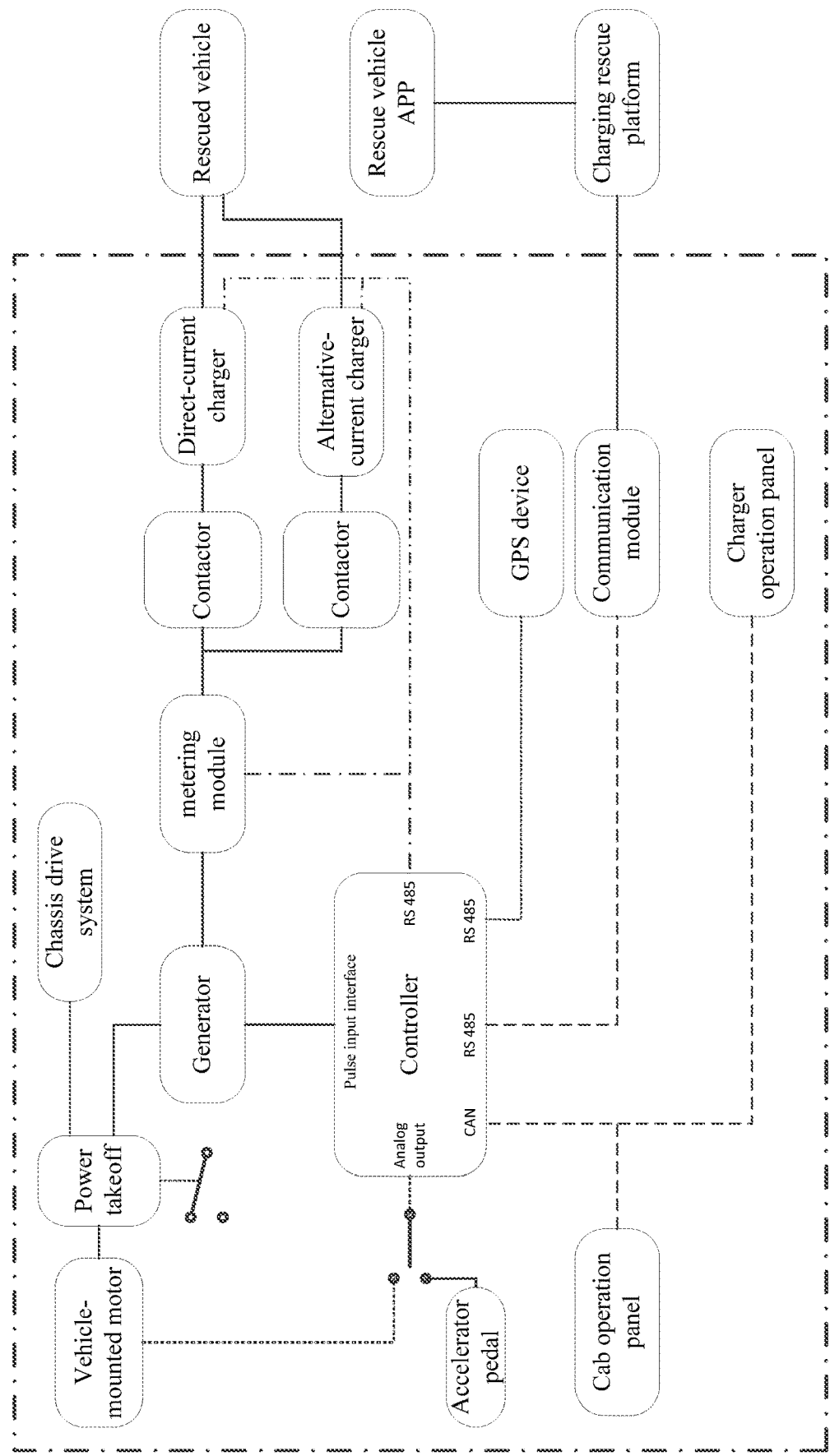
FIG. 3 is a principle diagram of a structure of a charging rescue vehicle according to the disclosure.

Referring to FIG. 1, FIG. 2 and FIG. 3, an Internet-based intelligent mobile charging system according to the disclosure comprises a rescue vehicle APP, a charging rescue vehicle, a rescued vehicle APP and a rescue platform, wherein the rescue vehicle APP includes a first user module, a first order module, a monitoring module and a first communication module; the charging rescue vehicle includes a controller, a GPS device, a direct-current charger, an alternative-current charger and a metering module; the rescued vehicle APP includes a second user module, a second order module, a payment module and a second communication module; the rescue platform includes an access module, an order execution module, a vehicle screening module, a rescue vehicle monitoring module, a bill management module and a user certification module; a first serial port of the controller in the charging rescue vehicle is simultaneously connected with the direct-current charger, the alternative-current charger and the metering module, a second serial port of the controller is connected with the GPS device, and a third serial port of the controller is connected with the monitoring module of the rescue vehicle APP; the first user module, the first order module and the monitoring module of the rescue vehicle APP are simultaneously connected to the first communication module; the second user module, the second order module and the payment module of the rescued vehicle APP are simultaneously connected to the second communication module; the first and second communication modules are both connected with the access module of the rescue platform, the access module of the rescue platform is connected with the order execution module, the vehicle screening module, the bill management module, the rescue vehicle monitoring module and the user certification module; the charging rescue vehicle includes a vehicle-mounted motor, a power takeoff, a chassis drive system, a generator, a metering module, a controller, a direct-current charger, an alternative-current charger, a cab operation panel, a charger operation panel, a GPS device and a third communication module; through the power takeoff, an output shaft of the vehicle-mounted motor selects to be connected with an input shaft of the generator or the chassis drive system, a power supply output of the generator is connected with an input interface of the metering device, an output interface of the metering device is connected with an alternative-current power supply input interface of the direct-current charger and a power supply input interface of the alternative-current charger, and output charging interfaces of the direct-current charger and the alternative-current charger are connected with a charging input interface of a fully electric vehicle; the simulation output interface of the controller is connected with a throttle control line of the vehicle-mounted motor, a pulse input interface of the controller is connected with a rotary speed sensor of the generator, a first serial port of the controller is simultaneously connected with the metering device, the direct-current charger and the alternative-current charger, a CAN bus interface of the controller of the cab operation panel and the charger operation panel, another two serial ports of the controller are respectively connected with the GPS device and the communication module; the third communication module is connected with the rescue platform through GPRS, and the rescue vehicle APP is connected with the rescue platform through Internet.

The GPRS includes but is not limited to WIFI, 3G and 4G.

A smart mobile charging method using Internet, comprising: 1) selecting a one-key rescue function on a rescued vehicle APP by a drier of an electric vehicle;

2) by the rescued vehicle APP, packaging user information and GPS information and sending a rescue application;

3) by the rescue platform, acquiring the rescue application and analyzing the user information and the GPS information to generate an order form;

4) calculating priority based on a preferred algorithm according to the GPS information of the current charging rescue vehicle by a vehicle screening module of the rescue platform;

5) pushing a charging rescue list to an operator according to a priority descending order by the rescue platform;

6) selecting a charging rescue vehicle having the highest priority to allocate the rescue order by the operator;

7) estimating rescue cost and time according to the GPS information of the charging rescue vehicle accepting the order by the rescue platform;

8) acquiring the order and accepting the order by the charging rescue vehicle;

9) pushing the estimated cost and time and a state of the charging rescue vehicle to the rescued vehicle APP by the rescue platform;

10) selecting whether the rescue order is accepted or not by the driver of the electric vehicle;

11) informing the rescue vehicle APP that execution of a rescue action is started by the order executing module of the rescue platform if the acceptance of rescue is selected;

12) in the process of rescue, acquiring the GPS information of the charging rescue vehicle in real time and pushing to the rescued vehicle APP by a rescue vehicle monitoring module of the rescue platform, and knowing a position, a speed and expected arrival time of the charging rescue vehicle by the driver of the electric vehicle;

13) selecting a charging mode by the driver of the electric vehicle to charge the electric vehicle when the charging rescue vehicle arrives;

14) in the process of charging, sending data of the charger and the metering module to the rescue platform in real time by the charging rescue vehicle;

15) pushing real-time charging data of the charging rescue vehicle to the rescued vehicle APP by the rescue platform through the order execution module;

16) seeing the charging process on the rescued vehicle APP by a user;

17) after charging is completed, by the rescue vehicle APP, pushing the order information to be sent to the rescued vehicle APP via the rescue platform;

18) informing the user of payment by the rescued vehicle APP, and evaluating;

19) sending payment and evaluation information to the rescue platform by the rescued vehicle APP; and 20) by the rescue platform, ending this rescue and pressing the rescue order into the bill management module.

The above smart mobile charging method using Internet specifically comprises the following steps:

1) first, installing a rescued vehicle APP on a mobile phone of a driver of an electric vehicle, connecting a user module in the rescued APP to an access module of a rescue platform through a communication module and Internet, registering user information in a user certification module in the rescue platform, and binding a vehicle-relevant information of a fully electric vehicle;

2) operating the rescued vehicle APP on the mobile phone by a driver when the fully electric vehicle is broken down due to power shortage, at this moment, automatically initiating the user module by the rescued vehicle APP to be connected to the access module of the rescue platform by virtue of 3G and 4G networks through the communication module and Internet, entering a home page of the rescued vehicle APP through the rescue platform and after being certified by the user certification module, at this moment, allowing the driver to use a one-key rescue function so that the order module immediately initiates to send rescue application information, user data and current user GPS position data to the rescue platform through the communication module and Internet, and acquiring this data to be immediately pushed to the order execution module by the access module of the rescue platform;

3) generating a complete order form in the order execution module, and simultaneously allowing the acquired user information to be matched with vehicle data in database by the order form, and packaging vehicle data and GPS data to be pushed to a vehicle screening module;

4) after acquiring vehicle preferred application in the order execution module by the vehicle screening module, acquiring relevant GPS data, idle state data and vehicle model matching data from the monitoring module of the rescue vehicle APP according to GPS information and vehicle data of the rescued vehicle, then synthesizing data, performing priority scoring on each rescue vehicle according to a priority strategy algorithm, and pushing the data to the order execution module in a descending order according to scores;

5) by the operator of the rescue platform, selecting the most appropriate vehicle according to priority scores and allocating the order to this rescue vehicle;

6) installing the rescue vehicle APP on a display terminal of the rescue vehicle, when the rescue vehicle works, initiating the display terminal, connecting the rescue vehicle APP to the rescue platform through the communication module and Internet, and certifying by the user certification module on the rescue platform; due to a monitoring module existing in the rescue vehicle APP, communicating this monitoring module with the controller of the charging rescue vehicle through Bluetooth, a serial port, WIFI or Ethernet, and connecting the controller of the charging rescue vehicle with the direct-current charger, the alternative-current charger, the metering module and the GPS device through serial ports; acquiring current, voltage, temperature relevant data of the direct-current charger and the alternative-current charger from the controller of the charging rescue vehicle by the monitoring module of the rescue vehicle APP; packaging all the data such as electric quantity and charging duration relevant data of the metering module and GPS position data of the charging rescue vehicle to be sent to the access module of the rescue platform through the communication module and Internet, and then sending the data to the monitoring module of the rescue vehicle APP by the access module; and monitoring the position of each rescue vehicle, states of alternative-current and direct-current charger and data of the metering module by the monitoring module of the rescue vehicle APP;

7) when the order data is sent to the rescue vehicle APP by the order execution module of the rescue platform through the communication module and Internet, by an order module in the rescue vehicle APP, acquiring order information and showing the order information to the driver of the rescue vehicle, selecting acceptance or refusal by a worker of the rescue vehicle according to own conditions, reselecting the rescue vehicle by the rescue platform if refusal is selected, and calculating a distance and expected rescue cost by the rescue platform according to GPS information of the rescue vehicle and GPS information of the rescued vehicle if acceptance is selected; sending the expected cost and expected arrival time as well as relevant information of the charging rescue vehicle to the rescued vehicle APP by the rescue platform, receiving the information by the rescued vehicle APP, auditing whether the order content is accepted by the driver of the fully electric vehicle, if the driver of the fully electric vehicle selects to accept the order, allowing the order to take effect, and tracking an order execution process by the order execution module of the rescue platform; by the order execution module, acquiring rescue vehicle data in the monitoring module of the rescue vehicle APP and sharing the rescue vehicle data to the order module of the rescued vehicle APP through the communication module and Internet; and inquiring the position, speed and expected arrival time state of the rescued vehicle in real time in the order module;

8) after the charging rescue vehicle arrives at the position of the rescued vehicle, selecting the charging mode by a user and charging the rescued vehicle, acquiring data of the metering module, the alternative-current charger and the direct-current charger in real time by the monitoring module in the rescue vehicle APP, packaging and sending the data to the rescue vehicle monitoring module of the rescue platform through the communication module and Internet, sharing the data through the order execution module and the order module of the rescued vehicle APP, and seeing the real-time charging situation of the charging rescue vehicle from the order module by the driver of the fully electric vehicle; and 9) after charging is completed, by the rescued vehicle APP, packaging relevant data of this charging and sending the data to the rescue vehicle monitoring module of the rescue platform through the communication module and Internet, transmitting the data to the order execution module by the rescue vehicle monitoring module, generating a bill by the order execution module, pushing the bill to the rescued vehicle APP through the access module, invoking a payment module by the rescued vehicle APP and paying by the user, evaluating this service after payment is completed, sending a payment state and evaluation information to the order execution module of the rescue platform through the communication module and Internet, ending this order by the order execution module, and then pressing the order record into the bill management module to conveniently inquire by the user.

The charging method of the charging rescue vehicle comprises:

1) parking a mobile charging vehicle for rescue in front of a rescued fully electric vehicle;

2) switching a power takeoff to a power taking gear;

3) driving a generator to rotate by the motor;

4) detecting a rotary speed of the generator by the controller;

5) stepping on a throttle by the controller if the rotary speed of the generator does not reach a rated rotary speed, and reducing the throttle by the controller if the generator exceeds the rated rotary speed;

6) measuring an output voltage of the generator by AVR when the rotary speed of the generator reaches the rated rotary speed;

7) increasing excitation by AVR if the output voltage of the generator is lower than a rated voltage, and reducing excitation by AVR if the output voltage of the generator is higher than the rated voltage;

8) allowing the output voltage of the generator to reach a rated value and to be stabilized;

9) outputting a charging-allowable signal;

10) selecting the direct-current charger by the user for rapid charging, and closing a contactor of a direct-current rapid charger by the controller; and 11) selecting the alternative-current charger by the user for slow charging, and closing a contactor of an alternative-current slow charger by the controller.

The charging method of the charging rescue vehicle specifically comprises the following steps:

1) cutting down an output main drive shaft of the vehicle-mounted motor, installing the power takeoff on the main drive shaft, wherein the power takeoff has two gears respectively including a power taking gear and a walking gear; when a handle is switched into the walking gear, outputting the rotary speed of the vehicle-mounted motor to rear axle tire, and the vehicle normally walking; when the handle is switched into the power takeoff gear, outputting the rotary speed of the vehicle-mounted motor to an input shaft of the motor coaxially connected with the power takeoff by the power takeoff, and allowing the vehicle to enter a generation working state;

2) by the vehicle-mounted motor, driving the input shaft of the generator to rotate through the power takeoff, installing a speed-measuring code wheel on the input shaft of the generator, installing a speed-measuring sensor to detect the rotary speed of the generator, allowing the signal of the speed-measuring sensor to access to a pulse input interface of the controller, detecting whether the rotary speed of the generator reaches the rated rotary speed such as 1500 rpm by the controller, if the rated rotary speed is not reached, increasing simulation quantity output by the controller through a PID algorithm, and enlarging the throttle; whereas, if the controller detects that the rotary speed of the generator exceeds the rated rotary speed, reducing the analog quantity output by the controller through the PID algorithm, and reducing the throttle, thereby allowing the rotary speed of the generator to be constant;

3) after the rotary speed of the generator is stabilized, namely 1500 rpm±4%, detecting the output voltage by an AVR module inside the generator, increasing excitation when the output voltage does not reach the rated value, whereas, reducing excitation when the output voltage is over high, thereby achieving the purpose of stabilizing an output power source of the generator;

4) allowing three-phase alternative-current 380 V power supply emitted by the generator to access to the metering device, measuring voltage, current, frequency and other relevant state data of the input power supply and metering electricity consumption by the metering device; and acquiring power supply state parameters and metering electrical degree data by the controller through the serial ports;

5) when the controller detects the state of the power supply is stabilized, such as 380 V±5%, outputting a charging-allowable signal by the controller; if the user selects direct-current rapid charging, outputting a control signal by the controller to control the closing of the contactor, and providing a power supply at an output end of the metering device to the direct-current charger; first, by a rectifier module in the direct-current charger, changing an input alternative-current power supply into direct current electricity through rectification, and meanwhile, acquiring battery and relevant data of the charged vehicle through a CAN bus by a CPU in the direct-current charger, then regulating to a proper voltage and current via a secondary voltage-regulating module according to vehicle model and battery information to charge the electric vehicle; meanwhile, by the controller, acquiring operation data, including charging current, charging voltage, cell temperature and other crucial data for consideration, of the direct-current charger through serial communication;

6) if the user selects the alternative-current charger, by the controller, outputting a control signal, closing the contactor, connecting the power supply at the output end of the metering device to the power supply input interface of the alternative-current charger, and charging the electric vehicle by the alternative-current charger; and similarly, by the controller, acquiring current, voltage and other data for consideration through serial communication;

7) setting a plurality of operation panels to be respectively placed beside a cab and chargers, displaying working parameters of various modules of a system on the operation panels, and setting buttons to control operation of each module of the system, in such a way, simultaneously seeing the working state of the system and instructing to the system by the driver and the user so as to achieve two-place operation and multi-place operation;

8) configuring the GPS device, by the GPS device, acquiring a satellite's signal to be converted into latitude and longitude information, and transmitting latitude and longitude data into the controller through serial communication; and also configuring a wireless communication module, connecting the controller with the wireless communication module through a serial port to send the above vehicle state, GPS position information, charging current, voltage, electric quantity and vehicle information to the rescue platform, and learning the rescue process through the rescue vehicle APP; and 9) by the driver of the fully electric vehicle, installing the rescued vehicle APP and using one-key rescue function of the rescued vehicle APP, at this moment, sending rescue information position information to the rescue platform by the rescued vehicle APP through GPRS, the GPRS including but not limited to 3G, 4G and WIFI, and after the rescue platform receives the rescue information, sending the rescue information to the controller through GPRS to guide the rescue vehicle to perform timely rescue, the GPRS including but not limited to 3G, 4G and WIFI.

We claim:

1. An Internet-based intelligent mobile charging system, comprising:
   a rescue vehicle APP which includes a first user module, a first order module, a monitoring module and a first communication module; wherein the first user module, the first order module and the monitoring module of the rescue vehicle APP are simultaneously connected to the first communication module; wherein the second user module, the second order module and the payment module of the rescued vehicle APP are simultaneously connected to the second communication module;
   a charging rescue vehicle which includes a controller, a global position system (GPS) device, a direct-current charger, an alternative-current charger and a metering module; wherein a first serial port of the controller in the charging rescue vehicle is simultaneously connected with the direct-current charger, the alternative-current charger and the metering module, a second serial port of the controller is connected with the GPS device, and a third serial port of the controller is connected with the monitoring module of the rescue vehicle APP;

a rescued vehicle APP which includes a second user module, a second order module, a payment module and a second communication module; and a rescue platform which includes an access module, an order execution module, a vehicle screening module, a rescue vehicle monitoring module, a bill management module and a user certification module; wherein the first and second communication modules are both connected with the access module of the rescue platform through Internet, and the access module of the rescue platform is connected with the order execution module, the vehicle screening module, the bill management module, the rescue vehicle monitoring module and the user certification module;

wherein the charging rescue vehicle further includes a vehicle-mounted motor, a power takeoff, a chassis drive system, a generator, a cab operation panel, a charger operation panel and a third communication module; an output shaft of the vehicle-mounted motor selects to be connected with an input shaft of the generator or the chassis drive system through the power takeoff, a power supply output of the generator is connected with an input interface of the metering device, an output interface of the metering device is connected with an alternative-current power supply input interface of the direct-current charger and a power supply input interface of the alternative-current charger, and output charging interfaces of the direct-current charger and the alternative-current charger are connected with a charging input interface of a fully electric vehicle; an analog output interface of the controller is connected with a throttle control line of the vehicle-mounted motor, an pulse input interface of the controller is connected with a rotary speed sensor of the generator, a CAN bus interface of the controller is connected with the cab operation panel and the charger operation panel; a fourth serial port of the controller is connected with the third communication module, the third communication module is connected with the rescue platform through a general packet radio service (GPRS), and the rescue vehicle APP is connected with the rescue platform through Internet.

2. The Internet-based intelligent mobile charging system according to claim 1, wherein, the GPRS includes WIFI, 3G and 4G.

3. An Internet-based intelligent mobile charging method, comprising:
1) selecting a one-key rescue function on a rescued vehicle APP by a driver of an electric vehicle;
2) by the rescued vehicle APP, packaging user information and GPS information and sending a rescue application;
3) by the rescue platform, acquiring the rescue application and analyzing the user information and the GPS information to generate an order form;
4) calculating priority based on a preferred algorithm according to GPS information of the current charging rescue vehicle by a vehicle screening module of the rescue platform;

5) pushing a charging rescue vehicle list to an operator according to a priority in a descending order by the rescue platform;
6) selecting a charging rescue vehicle having the highest priority to allocate the rescue order by the operator;
7) estimating rescue cost and time according to GPS information of the charging rescue vehicle accepting the order by the rescue platform;
8) acquiring the order and accepting the order by the charging rescue vehicle;
9) pushing the estimated cost and time and a state of the charging rescue vehicle to the rescued vehicle APP by the rescue platform;
10) selecting whether the rescue order is accepted or not by the driver of the electric vehicle;
11) informing the rescue vehicle APP that execution of a rescue action is started by the order executing module of the rescue platform if acceptance of rescue is selected;
12) in the process of rescue, by a rescue vehicle monitoring module of the rescue platform, acquiring GPS information of the charging rescue vehicle in real time and pushing the GPS information to the rescued vehicle APP, so that the driver of the electric vehicle may know a position, a speed and expected arrival time of the charging rescue vehicle in real time;
13) when the charging rescue vehicle arrives, selecting a charging mode by the driver of the electric vehicle so that the rescue vehicle charges the electric vehicle;
14) in the process of charging, sending data of the charger and the metering module to the rescue platform in real time by the charging rescue vehicle;
15) pushing real-time charging data of the charging rescue vehicle to the rescued vehicle APP by the rescue platform through the order execution module;
16) seeing the charging process on the rescued vehicle APP by a user;
17) after charging is completed, by the rescue vehicle APP, pushing the order information to be sent to the rescued vehicle APP via the rescue platform;
18) informing the user of payment by the rescued vehicle APP, and evaluating;
19) sending payment and evaluation information to the rescue platform by the rescued vehicle APP; and
20) by the rescue platform, ending this rescue and pressing the rescue order into the bill management module.

4. The method according to claim 3, specifically comprising the following steps:
1) first, installing a rescued vehicle APP on a mobile phone of a driver of an electric vehicle, connecting a user module in the rescued vehicle APP to an access module of a rescue platform through a communication module and Internet, registering user information in a user certification module of the rescue platform, and binding a vehicle-relevant information of a fully electric vehicle;
2) operating the rescued vehicle APP on the mobile phone by the driver when the fully electric vehicle is broken down due to power shortage, at this moment, automatically initiating the user module by the rescued vehicle APP to be connected to the access module of the rescue platform by virtue of 3G and 4G networks through the communication module and Internet, and entering a home page of the rescued vehicle APP through the rescue platform and after being certified by the user certification module, at this moment, using a one-key rescue function by the driver so that the order module immediately initiates to send rescue application information, user data and current user GPS position data to the rescue platform through the communication module and Internet, and acquiring this data to be immediately pushed to the order execution module by the access module of the rescue platform;

3) generating a complete order form in the order execution module, and simultaneously allowing the acquired user information to be matched with vehicle data in database by the order form, and packaging the vehicle data and GPS data to be pushed to a vehicle screening module;

4) after acquiring a vehicle preferred application in the order execution module by the vehicle screening module, acquiring relevant GPS data, idle state data and vehicle model matching data from the monitoring module of the rescue vehicle APP according to GPS information and vehicle data of the rescued vehicle, then synthesizing data, performing priority scoring on each rescue vehicle according to a priority strategy algorithm, and pushing the data to the order execution module in a descending order according to scores;

5) by the operator of the rescue platform, selecting the most appropriate vehicle according to priority scores and allocating the order to this rescue vehicle;

6) installing the rescue vehicle APP on a display terminal of the rescue vehicle, when the rescue vehicle works, initiating the display terminal, connecting the rescue vehicle APP to the rescue platform through the communication module and Internet, and certifying by the user certification module on the rescue platform; due to the monitoring module existing in the rescue vehicle APP, communicating this monitoring module with the controller of the charging rescue vehicle through Bluetooth, a serial port, WIFI or Ethernet, and connecting the controller of the charging rescue vehicle with the direct-current charger, the alternative-current charger, the metering module and the GPS device through serial ports; acquiring current, voltage and temperature relevant data of the direct-current charger and alternative-current charger from the controller of the charging rescue vehicle by the monitoring module of the rescue vehicle APP; packaging all the data such as electric quantity and charging duration relevant data of the metering module and the GPS position data of the charging rescue vehicle to be sent to the access module of the rescue platform through the communication module and Internet, and then sending the data to the monitoring module of the rescue vehicle APP by the access module; and monitoring the position of each rescue vehicle, states of the alternative-current and direct-current chargers and data of the metering module by the monitoring module of the rescue vehicle APP;

7) when the order data is sent to the rescue vehicle APP by the order execution module of the rescue platform through the communication module and Internet, by the order module in the rescue vehicle APP, acquiring order information and showing the order information to the driver of the rescue vehicle, selecting acceptance or refusal by a worker of the rescue vehicle according to own conditions, reselecting the rescue vehicle by the rescue platform if refusal is selected, and calculating a distance and expected rescue cost by the rescue platform according to GPS information of the rescue vehicle and GPS information of the rescued vehicle if acceptance is selected; sending the expected cost and the expected arrival time as well as relevant information of the charging rescue vehicle to the rescued vehicle APP by the rescue platform, receiving the information by the rescued vehicle APP, auditing whether the order content is accepted by the driver of the fully electric vehicle, if the driver of the fully electric vehicle selects to accept the order, allowing the order to take effect, tracking an order execution process by the order execution module of the rescue platform, acquiring rescue vehicle data in the monitoring module of the rescue vehicle APP by the order execution module and sharing the rescue vehicle data to the order module of the rescued vehicle APP through the communication module and Internet;

and inquiring the position, speed and expected arrival time state of the rescued vehicle in real time in the order module by the driver of the fully electric vehicle;

8) after the charging rescue vehicle arrives at the position of the rescued vehicle, selecting a charging mode by a user and charging the rescued vehicle, acquiring data of the metering module, the alternative-current charger and the direct-current charger of the rescue vehicle in real time by the monitoring module in the rescue vehicle APP, packaging and sending the data to the rescue vehicle monitoring module of the rescue platform through the communication module and Internet and sharing the data through the order execution module and the order module of the rescued vehicle APP, and seeing the real-time charging situation of the charging rescue vehicle from the order module by the driver of the fully electric vehicle; and 9) after charging is completed, by the rescued vehicle APP, packaging relevant data of this charging to be sent to the rescue vehicle monitoring module of the rescue platform through the communication module and Internet, transmitting the data to the order execution module by the rescue vehicle monitoring module, generating a bill by the order execution module, pushing the bill to the rescued vehicle APP through the access module, invoking a payment module by the rescued vehicle APP and paying by the user, evaluating this service after payment is completed, sending a payment state and evaluation information to the order execution module of the rescue platform through the communication module and Internet by the rescued vehicle APP, ending this order by the order execution module, and then pressing the order record into the bill management module to be stored so as to conveniently inquire by the user.

5. The method according to claim 3, wherein, the charging method of the charging rescue vehicle comprises:

1) parking a mobile charging vehicle for rescue in front of a rescued fully electric vehicle;

2) switching a power takeoff to a power taking gear;

3) driving a generator to rotate by the motor;

4) detecting a rotary speed of the generator by the controller;

5) stepping on a throttle by the controller if the rotary speed of the generator does not reach a rated rotary speed, and reducing the throttle by the controller if the rotary speed of the generator exceeds the rated rotary speed;

6) measuring an output voltage of the generator by an automatic voltage regulator (AVR) when the rotary speed of the generator reaches the rated rotary speed;

7) increasing excitation by AVR if the output voltage of the generator is lower than a rated voltage, and reducing excitation by AVR if the output voltage of the generator is higher than the rated voltage;
8) allowing the output voltage of the generator to reach a rated value and to be stabilized;
9) outputting a charging-allowable signal;
10) selecting the direct-current charger by the user for rapid charging, and closing a contactor of a direct-current rapid charger by the controller; and
11) selecting the alternative-current charger by the user for slow charging, and closing a contactor of an alternative-current slow charger by the controller.

6. The method according to claim 3, wherein the charging method of the charging rescue vehicle specifically comprises the following steps:
1) cutting down an output main drive shaft of the vehicle-mounted motor, installing the power takeoff on the main drive shaft, wherein the power takeoff has two gears respectively including a power taking gear and a walking gear; when a handle is switched into the walking gear, outputting the rotary speed of the vehicle-mounted motor to rear axle tire, and the vehicle normally walking; and when the handle is switched into the power takeoff gear, outputting the rotary speed of the vehicle-mounted motor to an input shaft of the generator coaxially connected with the power takeoff by the power takeoff, and allowing the vehicle to enter a generation working state;
2) by the vehicle-mounted motor, driving the input shaft of the generator to rotate through the power takeoff, installing a speed-measuring code wheel on the input shaft of the generator, and installing a speed-measuring sensor to detect the rotary speed of the generator, allowing the signal of the speed-measuring sensor to access to a pulse input interface of the controller, detecting whether the rotary speed of the generator reaches the rated rotary speed such as 1500 rpm by the controller, if the rated rotary speed is not reached, increasing analog quantity output by the controller through a PID algorithm, and enlarging the throttle; whereas, if the controller detects that the rotary speed of the generator exceeds the rated rotary speed, reducing the simulation quantity output by the controller through the PID algorithm, and reducing the throttle, thereby allowing the rotary speed of the generator to be constant;
3) after the rotary speed of the generator is stabilized, namely 1500 rpm±4%, detecting the output voltage by an AVR module inside the generator, increasing excitation when the output voltage does not reach the rated value, whereas, reducing excitation when the output voltage is over high, thereby achieving the purpose of stabilizing an output power source of the generator;
4) allowing three-phase alternative-current 380 V power supply emitted by the generator to access to the metering device; by the metering device, measuring voltage, current, frequency and other relevant state data of the input power supply and metering electricity consumption; and by the controller, acquiring power supply state parameters and metering electrical degree data through the serial ports;
5) outputting a charging-allowable signal by the controller when the controller detects that the state of the power supply is stabilized, such as 380 V±5%; if the user selects direct-current rapid charging, outputting a control signal by the controller to control the closing of the contactor, providing a power supply at an output end of the metering device to the direct-current charger; by a rectifier module in the direct-current charger, first, changing an input alternative-current power supply into direct current electricity through rectification, and meanwhile, acquiring battery and relevant data of the charged vehicle by a center processing unit (CPU) in the direct-current charger through a CAN bus, and then regulating to a proper voltage and current via a secondary voltage-regulating module according to vehicle model and battery information to charge the electric vehicle; meanwhile, by the controller, acquiring operation data, including charging current, charging voltage, battery temperature and other crucial data for consideration, of the direct-current charger through serial communication;
6) if the user selects the alternative-current charger, outputting a control signal by the controller, closing the contactor, and connecting the power supply at the output end of the metering device to the power supply input interface of the alternative-current charger so that the alternative-current charger charges the electric vehicle; and similarly, by the controller, acquiring current, voltage and other data for consideration through serial communication;
7) setting a plurality of operation panels to be respectively disposed beside a cab and chargers, displaying working parameters of various modules of a system on the operation panels, and setting buttons to control operation of each module of the system, in such a way, simultaneously seeing the working state of the system and instructing to the system by the driver and the user so as to achieve two-place operation and multi-place operation;
8) configuring the GPS device, by the GPS device, acquiring a satellite's by the GPS device to be converted into latitude and longitude information, and transmitting latitude and longitude data into the controller through serial communication; and also configuring a wireless communication module, connecting the controller with the wireless communication module through a serial port to send the above vehicle state, GPS position information, charging current, voltage, electric quantity and vehicle information to the rescue platform, and learning the rescue process through the rescue vehicle APP; and
9) by the driver of the fully electric vehicle, installing the rescued vehicle APP and using one-key rescue function of the rescued vehicle APP, at this moment, sending rescue information and position information to the rescue platform by the rescued vehicle APP through GPRS, and after the rescue platform receives the rescue information, sending the rescue information to the controller through GPRS to guide the rescue vehicle to perform timely rescue, wherein the GPRS includes 3G, 4G and WIFI.

* * * * *